Aug. 3, 1954
W. J. WEBSTER
2,685,325
INVALID CART
Filed June 23, 1951
3 Sheets-Sheet 1
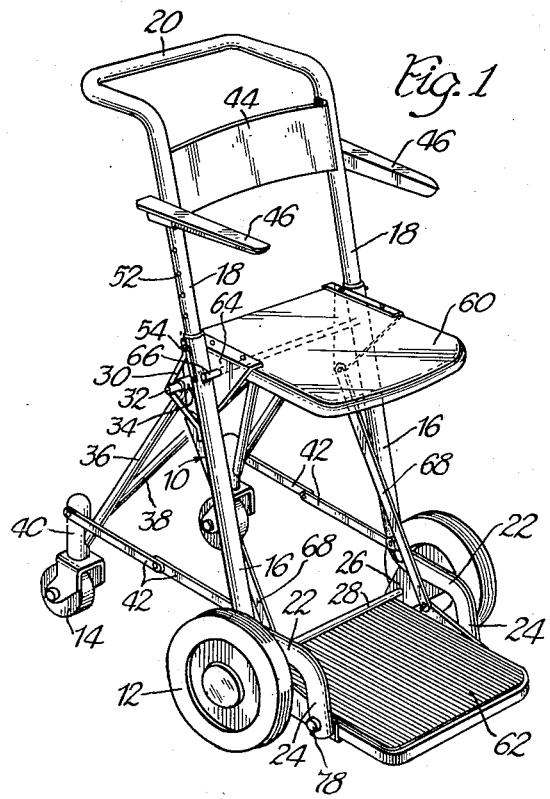
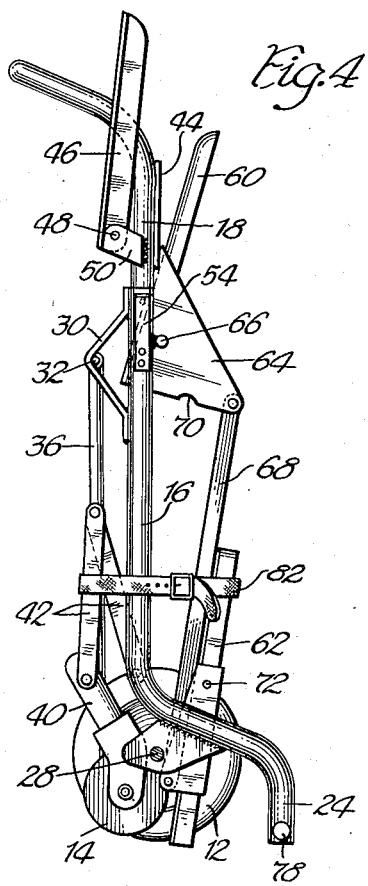
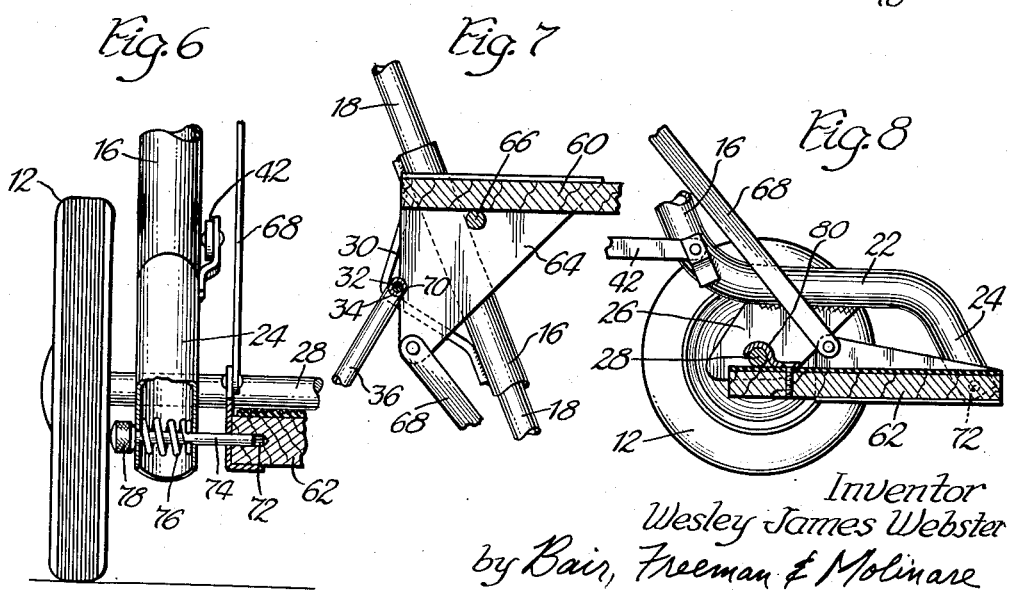
Inventor
Wesley James Webster
by Bair, Freeman & Molinare
Attys.

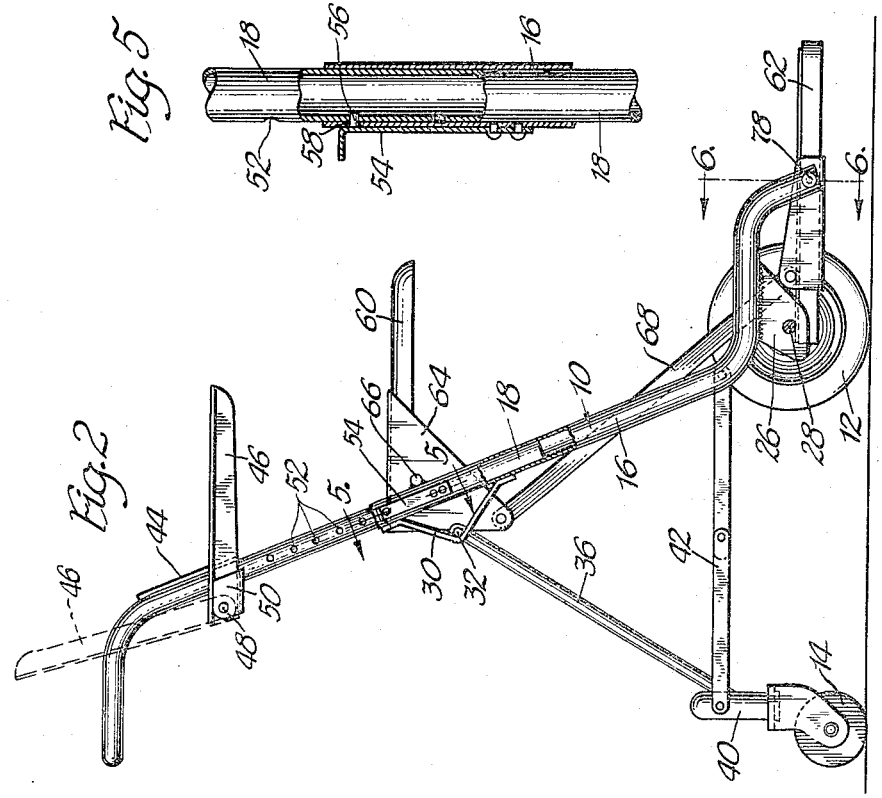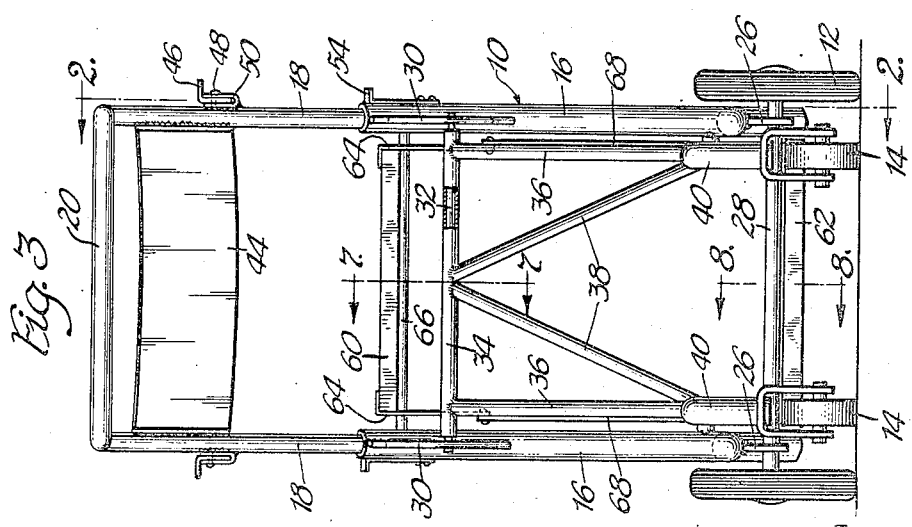

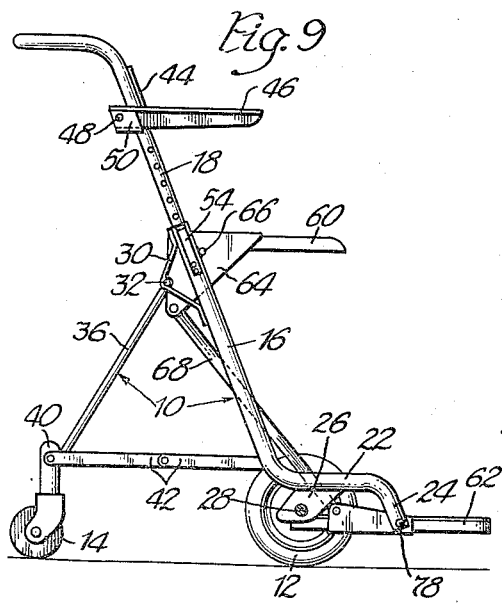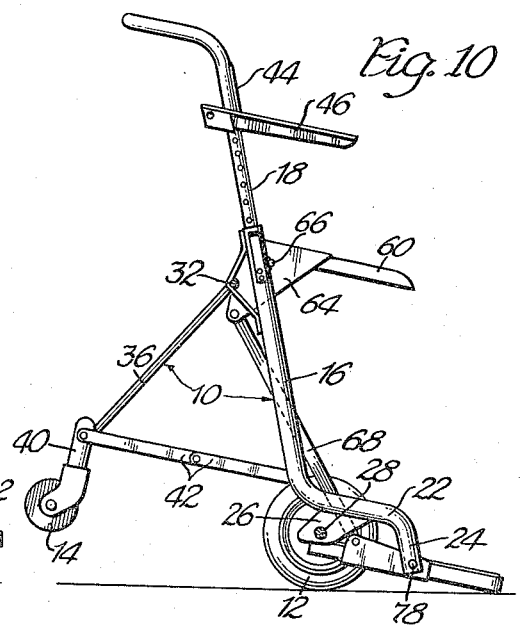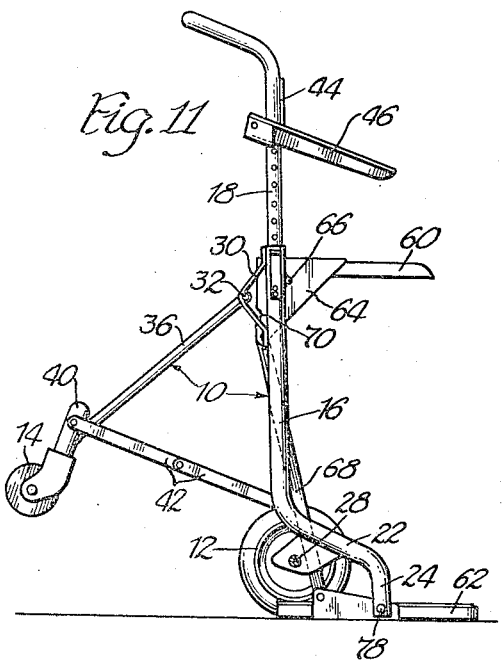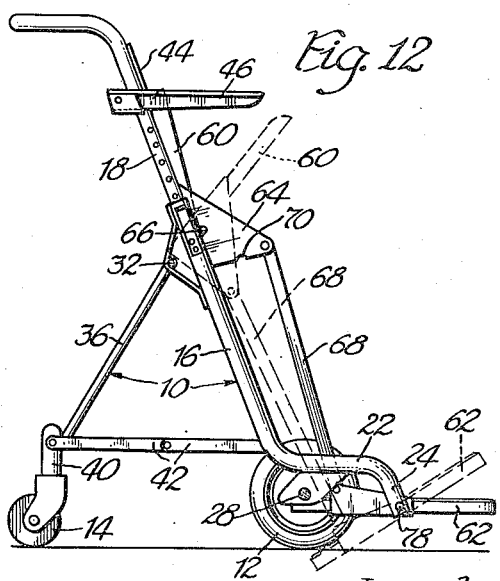

Patented Aug. 3, 1954

2,685,325

UNITED STATES PATENT OFFICE 2,685,325

INVALID CART

Wesley James Webster, River Forest, Ill.

Application June 23, 1951, Serial No. 233,131

7 Claims. (Cl. 155—30)

This invention pertains to an invalid cart, and more particularly to an invalid cart which is constructed and arranged for assisting the invalid to mount and dismount said cart.

Invalids having certain types of disabilities are frequently required to sit in a cart for movement from place to place, such as for treatment in a hospital.

Some of these invalids have a limited amount of control of motion and it is often desirable that such invalids take advantage of their limited capacities so as to mount and dismount, with minimum aid, from their carts.

Thus, one of the objects of this invention is to provide an improved invalid cart, requiring minimum assistance for an invalid in mounting and dismounting from the cart.

Another object of this invention is to provide an improved invalid cart which may be readily collapsed into a relatively small volume for ease in transportation and storage.

A further object of this invention is to provide an improved cart of the character indicated, which may be readjusted for conveniently transporting an invalid in upright position.

Still another object of this invention is to provide a novel invalid cart having a footrest and a seat normally positioned rearwardly of the footrest, wherein said seat is adapted to be moved forwardly, when the invalid steps on the footrest, into a position for conveniently seatingly receiving the invalid.

Still a further object of this invention is to provide an invalid cart having a footrest and a seat normally positioned rearwardly of the footrest, and said seat being adapted for movement forwardly and upwardly against the invalid, when the invalid steps on the footrest, whereby said invalid may be conveniently seated on said cart.

And a still further object is to provide an improved cart of the character indicated, having movable armrests, adapted to be moved to an inoperative position to afford easy mounting, by an invalid from the side of the cart.

Other objects and advantages of this invention will be apparent from the following description taken in connection with the accompanying drawings in which:

Figure 1 is a perspective view of the invalid cart.

Figure 2 is a side elevation of the invalid cart, with parts in section, taken at line 2—2 on Figure 3, showing in dotted lines the position of the armrests when swung out of supporting position.

Figure 3 is a rear elevation of the invalid cart shown in Figure 2.

Figure 4 is a side elevation of the invalid cart in collapsed position.

Figure 5 is a fragmentary view, partly in section, taken on line 5—5 of Figure 2.

Figure 6 is an enlarged view, partly in section, taken on line 6—6 of Figure 2.

Figure 7 is an enlarged view, partly in cross section, taken on line 7—7 of Figure 3.

Figure 8 is a view including a modified support, taken on line 8—8 of Figure 3.

Figure 9 is a side elevation view, similar to Figure 2, showing the cart before the invalid steps on the footrest.

Figure 10 shows the cart of Figure 9 in the position which it assumes, preparatory to an invalid stepping on the footrest, and with the footrest secured to the front wheel axle so as to prevent the footrest from resting completely on the ground.

Figure 11 shows the cart tilted forwardly so that the entire footrest is caused to rest flat on the floor or ground.

Figure 12 shows the cart of Figure 9, with the seat folded up out of the way so as to permit use of the cart in transporting an invalid in approximately upright position, or for transporting oxygen cylinders or the like; the dotted portion of the figure showing an intermediate position of the parallel linkage past the over-center position.

Referring now to the drawings, there is shown in Figure 1 an invalid cart comprising a tubular framework generally indicated at 10, supported on front supporting wheels 12, and rear supporting casters 14. The framework 10 includes a pair of lower tubular rails 16 and a pair of upper tubular rails 18 telescopically inserted in rails 16. The upper tubular rails 18 are joined together, and formed of a single member, and the intermediate position forms a hand grasp portion 20.

The lower tubular rails 16 are deformed at the lower ends thereof to form, forwardly extending, substantially horizontal portions 22 and the depending feet 24. Welded to the horizontal tubular portions 22 and extending therebelow are brackets 26 within which an axle 28 of wheels 12 is journalled. The depending feet 24, in some instances, also serve as handles, so that two people may respectively grasp the cart by handle 20 and feet 24 for a purpose described hereinbelow.

Welded adjacent the upper ends of lower rails 16 are a pair of angle shaped strips 30 and a rod 32 is welded in the crotch of said angle shaped strips 30. The rear casters 14 depend from a subframe that is adapted to be pivoted around rod 32. This sub-frame includes a tube 34 rotatably mounted on rod 32, and two sets of tubular cross members 36 and 38. These tubular cross members 36 and 38 are welded at one end thereof to tube 34 and at the other end to caster sockets 40 in which the casters 14 are mounted. An articulated linkage 42 connects the caster sockets 40 to the lower rails 16, and provides means for spreading apart the front supports 12 and rear supports 14 and maintaining them in proper spaced relation.

The cart also includes a backrest 44 which is welded in position between upper tubular rails 18. A pair of armrests 46 are secured to the upper tubular rails 18. These armrests 46 are pivoted about pins 48 which are mounted in U-shaped supports 50 welded to the telescopic rails 18, as seen in Figure 3. The pin 48 is located behind the rails 18 so that when the armrests are pivoted out of position, as shown in dotted lines in Figure 2, they provide a completely unobstructed space above the seat and forwardly of the upper rails 18, so as to conveniently permit sidewise entrance of the torso of the invalid onto the seat of the cart. When the arms are lowered to operative position, they abut against the U-shaped supports 50.

The upper telescopic rails 18 are provided with a plurality of vertically spaced holes 52 along the length thereof, for fixing the height of the handle 20, backrest 44 and arm supports 46 with respect to the seat of the cart. Means is provided for adjusting the position of the upper rails 18 telescopically within lower rails 16, and includes pins 56 which are mounted on the extended end of resilient arms 54, secured at one end on one each of the lower rails 16. These pins 56 are adapted to protrude through holes 58 in rails 16, and extend into registering holes 52 in the upper tubular rails 18, as clearly shown in Figure 5 for fixedly securing rails 16 and 18 in a desired position of adjustment.

The cart is also provided with a seat 60 and a footrest 62. The seat 60 has welded thereto, at opposite sides, a pair of downwardly extending flanges 64. These flanges 64 are pivotally supported on a horizontal rod 66 which is welded adjacent its ends to the lower tubular rails 16. The footrest 62 is connected to the seat 60 for conjoint operation, by means of a pair of links 68 which are pivotally connected at the lower end to the footrest 62, and at the upper end to the seat flanges 64. The flanges 64 in effect serve as links extending between rod 66 and the pivotal connection of flanges 64 to links 68. The links so defined by flanges 64, in combination with links 68, in effect define an expanding linkage, the expansion of which may be seen by comparing Figures 10 and 11. The links 68 serve as parallel links between the seat 60 and the footrest 62 when the footrest 62 is pivoted about some fixed point on the framework 10, as will be described. The flanges 64 are provided with notches 70 to provide seating engagement thereof with tube 34. The engagement of flanges 64 with tube 34 limits the pivoting of the seat 60 about rod 66 and assists in stabilizing the seat.

The footrest 62 is adapted to be pivoted with respect to points on the depending feet 24 of the lower tubular rails 16. The side edges of the footrest 62 is provided with pin sockets 72, within which pivot pins 74 are adapted to be entered to provide a pivotal connection between the footrest 62 and the framework 10. The pivot pins 74 are biased by means of springs 76 toward each other so that the pins 74 are normally retained in the sockets 72. The pivot pins 74 are provided with knurled heads 78 which permit convenient grasping of the pins to withdraw the same from the sockets 72 to release the footrest 62 with respect to the frame 10.

The footrest 62, when in a horizontal position, is disposed below the axle 28 of the front wheels. A portion of the footrest 62 extends underneath the axle 28 and the axle 28 serves to limit the pivoting of the rear end of the footrest 62 upwardly about the pivot pins 74. A clamp or stop member 80, as shown in Figure 8, may, if desired, also be provided, to limit the downward pivoting of the rearward edge of footrest 62 about the pivot pins 74. This clamp 80 is optional and is to be used primarily when the cart is used in the converted form shown in Figure 12, with the seat 60 in the raised position and the footrest 62 in a horizontal position. The clamp serves to prevent downward pivoting of the footrest 62 when greater weight is imposed on the rearward end than the forward end of the footrest 62.

In the operation of the invalid cart, the invalid may either step on the footrest 62 and cause the cart to assume a position as in Figure 11, or the cart may manually be tilted from the position shown in Figure 9 to either of the positions shown in Figures 10 or 11. After the invalid manually pivots the cart to the position shown in Figure 11, he then steps onto the footrest and seats himself onto seat 60. Since the point of support of the seat 60, that is rod 66, and the backrest 44 are both positioned rearwardly of the axle 28, the invalid may right the cart to the position shown in Figure 9 simply by leaning backward, thereby moving the center of gravity of the loaded cart to a position between the front and rear wheel supports.

The invalid may also mount the cart by stepping onto the footrest 62 while facing forward. The cart is then swung forward to the position shown in Figure 10 and the invalid may simply seat himself on seat 60 and lean backward, thus righting the cart. For invalids that are unable to seat themselves on the sloping seat 60 shown in Figure 10, the invalid, after tilting the cart to the position shown in Figure 10, may move rearwardly on the footrest 62 until the footrest 62 is brought down flat against the floor, as shown in Figure 11. When that happens, the seat 60 is brought forwardly to a full forward, horizontal position and also moves upwardly with respect to the footrest 62. Thus, the seat moves forwardly against the body of the invalid and upwardly under the seat of the invalid so as to actually assist in seating the invalid. The invalid then has only to lean backward against the backrest 44, to move the center of gravity of the loaded cart to a position between the front and rear wheel supports; and this action will right the cart.

In converting the cart from the form shown in Figure 9 to the form shown in full lines in Figure 12, the parallel link 68 must first be swung to an over-center position, as shown in the dotted lines in Figure 12, and then pivoting of the footrest 62 to the full line position shown in Figure 12, results in the pivoting of the seat 60 to the full line position shown in Figure 12. The cart is then available for moving invalids in an approximately upright position, or for moving other loads, such as oxygen cylinders, which are placed upon the footrest; the seat 60 having been moved to unobstructing position, and it being understood that clamp 80 is then placed in operative position, as seen in Figure 8.

The handle 20 and depending feet 24 are adapted to be grasped respectively by two persons for the purpose of carrying the cart and invalid thereon up or down stairs. This means of supporting the cart at opposite ends of the framework permits carrying the cart with the tubular rails 16 and 18 substantially horizontal, which, at times, may be desirable. When the cart is being thus carried, and with the arms 46 swung to the folded position shown in dotted lines in Figure 2, the invalid may be rolled or slid off the cart onto a bed.

The entire cart may also be collapsed for compact storage. The cart is shown collapsed in Figure 4, wherein the seat 60 is swung upwardly as in Figure 12. In Figure 4, the footrest 62 has been released from its pivoted position by withdrawing pivot pins 74 from pivot sockets 72, and the footrest 62 is then swung substantially parallel to the links 68. The rear casters 14 are brought forwardly by means of folding the articulated linkage 42, and the armrests 46 are swung to a position where they are substantially parallel with the rails 16 and 18. A strap 82 may be provided for tying the articulated members together so as to secure the cart in the collapsed position.

Although I have shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim as my invention:

1. An invalid cart comprising front and rear wheel supports, a framework mounted on said supports and having its center of gravity positioned between said supports, a footrest pivotally mounted with respect to said framework and extending forwardly of the front support, said footrest being spaced closely adjacent the ground, a seat pivotally supported on said framework, said footrest, when stepped upon, causing the invalid cart to pivot forwardly about said front support and causing said footrest to pivot about its mounting until said footrest is supported by the ground, and an expanding linkage including a plurality of links interconnecting the seat and footrest for moving said seat forwardly and upwardly with respect to said footrest, incident to pivotal movement of the footrest relative to the framework, whereby said seat is caused to move forwardly and upwardly against the legs of the invalid standing on said footrest, said linkage having an over-center position to permit folding of said seat in an upwardly direction, substantially parallel to said framework while said footrest is maintained substantially horizontally.

2. An invalid cart comprising front and rear wheel supports, a framework mounted on said supports having a major portion thereof extending upwardly and having its center of gravity positioned between said supports, a footrest pivotally mounted with respect to said framework and extending forwardly of the front support, a seat disposed substantially parallel to said footrest, said seat being pivotally supported on said framework at a point between said supports, a linkage interconnecting said seat and said footrest adapted to maintain said seat and footrest substantially parallel, said linkage having an over-center position which permits folding away of said seat substantially parallel to the upwardly extending portion of said framework, said footrest being detachable from its pivotal connection to the framework and foldable to a position substantially parallel to said upwardly extending portion of the framework, and a foldable linkage between the front and rear supports permitting said rear support to be folded adjacent to and substantially parallel to said upwardly extending portion of the framework, whereby said cart may be compactly stored.

3. An invalid cart comprising front and rear wheel supports, a footrest, a seat, and a tubular main frame; said main frame comprising a straight central portion extending over the major portion of the frame upwardly from substantially adjacent the front support to a point spaced substantially above the rear support, a lower portion of the main frame extending forwardly above the front supports and interconnected thereto, said lower portion of the frame being connected to and serving to support said footrest forwardly of said front supports, an upper portion of the main frame extending laterally rearwardly and forming a hand rail, said seat being pivotally mounted on an intermediate portion of said main frame; and a sub-frame interconnecting said rear supports to said main frame.

4. An invalid cart comprising front and rear wheel supports, a framework mounted on said supports, said framework comprising spaced side rails running substantially straight over the major portion of their length extending over the height of the cart, a hand rail formed at the upper end of said framework, the lower portion of said side rails being deformed and extending forwardly of said front supports to form depending feet extending substantially parallel to said straight portions of the side rails, means on said framework for supporting an invalid, and said hand rail and said depending feet serving as hand grasp members, whereby the cart may be carried by and supported from the ends of the framework.

5. An invalid cart comprising front and rear supports, a framework mounted on said supports, a footrest and a seat each pivotally mounted on said framework and extending substantially horizontal and parallel to each other, and a pivotal linkage interconnecting the footrest and seat and adapted to maintain said substantially parallel relation therebetween when the footrest and seat are pivoted about their pivotal mountings, said linkage having an over center position which permits swinging of said seat into an upright position while maintaining said footrest substantially horizontal.

6. An invalid cart comprising front and rear wheel supports, an axially extending member between said front wheel supports, a framework mounted on said supports, a footrest pivotally mounted on a portion of said framework positioned forwardly of the axis of the front supports, a seat pivotally mounted on said framework extending substantially parallel to said footrest, and a pivotal linkage interconnecting the footrest and seat operative to maintain said substantially parallel relation therebetween when the footrest and seat are pivoted about their pivotal mountings, said footrest extending rearwardly of its pivotal mounting and below the axis of said front supports and adapted to engage said axially extending member.

7. An invalid cart comprising front and rear wheel supports, an axially extending member between said front wheel supports, a framework mounted on said supports, a footrest pivotally mounted on a portion of said framework positioned forwardly of the axis of the front supports, a seat pivotally mounted on said framework extending substantially parallel to said footrest, a pivotal linkage interconnecting the footrest or seat operative to maintain said substantially parallel relation therebetween when the footrest and seat are pivoted about their pivotal mountings, said footrest extending rearwardly of its pivotal mounting and below the axis of said front supports and adapted to engage said axially extending member, and means for selectively securing said footrest to said axially extending member.

References Cited in the file of this patent

UNITED STATES PATENTS

| Number | Name | Date |
|---|---|---|
| 410,591 | Hoffman | Sept. 10, 1889 |
| 1,364,181 | Cluff | Jan. 24, 1921 |
| 1,579,130 | Murray | Mar. 30, 1926 |
| 1,587,253 | Tarbox | June 1, 1926 |
| 1,611,807 | Bergh | Dec. 21, 1926 |
| 1,938,345 | Monchiero et al. | Dec. 5, 1933 |
| 1,943,037 | Overbey | Jan. 9, 1934 |
| 2,087,574 | Kaufer | July 20, 1937 |
| 2,383,039 | Bushnell | Aug. 21, 1945 |
| 2,427,161 | Roe | Sept. 9, 1947 |
| 2,568,988 | Childs | Sept. 25, 1951 |

FOREIGN PATENTS

| Number | Country | Date |
|---|---|---|
| 69,646 | Norway | Oct. 15, 1945 |
| 110,122 | Great Britain | Oct. 15, 1917 |